United States Patent
Agarwal et al.

(10) Patent No.: US 7,047,250 B1
(45) Date of Patent: May 16, 2006

(54) INDEXING TO EFFICIENTLY MANAGE VERSIONED DATA IN A DATABASE SYSTEM

(75) Inventors: Nipun Agarwal, Santa Clara, CA (US); Eric Sedlar, San Francisco, CA (US); Ravi Murthy, Fremont, CA (US)

(73) Assignee: Oracle International Corporation, Rewood Shores, CA (US)

( * ) Notice: Subject to any disclaimer, the term of this patent is extended or adjusted under 35 U.S.C. 154(b) by 415 days.

(21) Appl. No.: 10/260,161

(22) Filed: Sep. 27, 2002

Related U.S. Application Data (60) Provisional application No. 60/326,052, filed on Sep. 28, 2001, provisional application No. 60/378,800, filed on May 7, 2002.

(51) Int. Cl.
G06F 7/00 (2006.01)
G06F 17/00 (2006.01)
(52) U.S. Cl. .............................. 707/102; 707/3; 707/4; 707/7; 707/100; 707/104.1; 707/201; 709/203; 709/206; 709/224
(58) Field of Classification Search ............... 707/1–5, 707/100–104.1, 201–206, 7, 8; 709/201, 709/203, 206, 207, 221, 224
See application file for complete search history.

(56) References Cited

U.S. PATENT DOCUMENTS

| | | | |
|---|---|---|---|
| 5,295,261 A | 3/1994 | Simonetti | 395/600 |
| 5,404,513 A | 4/1995 | Powers et al. | |
| 5,467,471 A | 11/1995 | Bader | 395/600 |
| 5,625,815 A * | 4/1997 | Maier et al. | 707/8 |
| 5,680,614 A | 10/1997 | Bakuya et al. | |
| 5,724,577 A | 3/1998 | Exley et al. | 395/611 |
| 5,734,887 A | 3/1998 | Kingberg et al. | 395/604 |
| 5,878,415 A | 3/1999 | Olds | |
| 5,960,194 A * | 9/1999 | Choy et al. | 707/102 |
| 5,974,407 A | 10/1999 | Sacks | 707/2 |
| 5,983,215 A * | 11/1999 | Ross et al. | 707/2 |
| 5,987,506 A | 11/1999 | Carter et al. | |

(Continued)

FOREIGN PATENT DOCUMENTS

WO WO 01/59602 A1 8/2001

(Continued)

OTHER PUBLICATIONS

R. Bourret, et al., "A Generic Load/Extract Utility For Data Transfer Between XML Documents and Relational Databases," Proc. Second International Workshop on Advanced Issues of E-Commerce and Web-Based Information Systems, IEEE Computing Society, Jun. 8-9, 2000, pp. 134-143.

(Continued)

*Primary Examiner*—Jeffrey Gaffin
*Assistant Examiner*—Jacques Veillard
(74) *Attorney, Agent, or Firm*—Hickman Palermo Truong & Becker, LLP (57) ABSTRACT

A method and apparatus for accessing information using indexes on versioned tables is described that exploits the power of partitioned indexing to index versioned data. In partitioned indexing, an index is divided in sub-indexes, referred to as index partitions. An index may be, for example, partitioned according to a particular version identified by a version id, that is, each index partition indexes the rows in a versioned table that belong to the version identified by a particular version id. Partitioned indexes can be more efficient to use to access versioned data. The utility of partitioned indexes extends beyond indexing versioned data.

26 Claims, 3 Drawing Sheets

U.S. PATENT DOCUMENTS

| | | | |
|---|---|---|---|
| 6,003,040 A | 12/1999 | Mital et al. | |
| 6,038,563 A | 3/2000 | Bapat et al. | |
| 6,055,544 A | 4/2000 | DeRose et al. | |
| 6,061,684 A | 5/2000 | Glasser et al. | |
| 6,128,610 A | 10/2000 | Srinivasan et al. | |
| 6,141,655 A | 10/2000 | Johnson et al. | |
| 6,154,741 A | 11/2000 | Feldman | |
| 6,189,012 B1 | 2/2001 | Mital et al. | |
| 6,199,195 B1 | 3/2001 | Goodwin et al. | |
| 6,208,993 B1 | 3/2001 | Shadmone | |
| 6,236,988 B1 | 5/2001 | Aldred | |
| 6,263,332 B1 | 7/2001 | Nasr et al. | |
| 6,269,380 B1 | 7/2001 | Terry et al. | |
| 6,279,006 B1 | 8/2001 | Shigemi et al. | |
| 6,279,007 B1 | 8/2001 | Uppala | |
| 6,298,349 B1 | 10/2001 | Toyoshima et al. | |
| 6,341,289 B1 * | 1/2002 | Burroughs et al. | 707/104.1 |
| 6,343,287 B1 | 1/2002 | Kumar et al. | |
| 6,356,920 B1 | 3/2002 | Vandersluis | |
| 6,366,934 B1 | 4/2002 | Cheng et al. | |
| 6,370,537 B1 | 4/2002 | Gilbert et al. | |
| 6,438,562 B1 * | 8/2002 | Gupta et al. | 707/201 |
| 6,470,344 B1 | 10/2002 | Kothuri et al. | |
| 6,487,546 B1 | 11/2002 | Witkowski | |
| 6,496,842 B1 | 12/2002 | Lyness | |
| 6,539,398 B1 | 3/2003 | Hannan et al. | |
| 6,571,231 B1 | 5/2003 | Sedlar | 707/1 |
| 6,609,121 B1 | 8/2003 | Ambrosini et al. | |
| 6,684,227 B1 | 1/2004 | Duxbury | |
| 6,718,322 B1 | 4/2004 | Brye | 707/3 |
| 6,725,212 B1 | 4/2004 | Couch et al. | |
| 6,732,222 B1 * | 5/2004 | Garritsen et al. | 711/103 |
| 6,754,661 B1 | 6/2004 | Hallin et al. | 707/100 |
| 6,772,350 B1 | 8/2004 | Belani et al. | |
| 6,778,977 B1 * | 8/2004 | Avadhanam et al. | 707/2 |
| 6,785,673 B1 | 8/2004 | Fernandez et al. | |
| 6,795,821 B1 * | 9/2004 | Yu | 707/3 |
| 6,826,727 B1 | 11/2004 | Mohr et al. | |
| 6,836,857 B1 | 12/2004 | Ten-Hove et al. | |
| 6,920,457 B1 | 7/2005 | Pressmar | |
| 2002/0143512 A1 | 10/2002 | Shamoto et al. | |
| 2002/0156811 A1 | 10/2002 | Krupa | |
| 2002/0184188 A1 | 12/2002 | Mandyam et al. | |
| 2002/0194157 A1 * | 12/2002 | Zait et al. | 707/2 |
| 2003/0004937 A1 | 1/2003 | Salmenkaita et al. | |
| 2003/0009361 A1 | 1/2003 | Hancock et al. | |
| 2003/0065659 A1 | 4/2003 | Agarwal et al. | |
| 2003/0078906 A1 | 4/2003 | Ten-Hove et al. | |
| 2003/0093672 A1 | 5/2003 | Cichowlas | |
| 2003/0101194 A1 | 5/2003 | Rys et al. | |
| 2003/0182624 A1 | 9/2003 | Large | |
| 2004/0043758 A1 | 3/2004 | Sorvari et al. | |
| 2004/0176958 A1 | 9/2004 | Salmenkaita et al. | |
| 2004/0225680 A1 | 11/2004 | Cameron et al. | |
| 2005/0050058 A1 | 3/2005 | Jain et al. | |
| 2005/0050092 A1 | 3/2005 | Jain et al. | |

FOREIGN PATENT DOCUMENTS

| | | |
|---|---|---|
| WO | WO 01/61566 A1 | 8/2001 |

OTHER PUBLICATIONS

S. Vorthmann, et al. "Beyond Schemas, Schema Adjuncts and the Outside World," Markup Languages, Online!, vol. 2, No. 3, Jun. 2000, pp. 1-8.

Mi-Ok Chae, et al., "Design and Implementation of an Object-Oriented Multimedia DBMS Tightly Coupled with Information Retrieval Functions," Proc. 17th IASTED International Conference on Applied Informatics, Feb. 15-18, 1999, abstract.

Hansrudi Noser, et al., "Dynamic 3D Visualization of Database-Defined Tree Structures on the WWW by Using Rewriting Systems," 2000, IEEE, XP-002262516, pp. 247-254.

Sushil Jajodia, et al., "Toward a Multilevel Secure Relational Data Model," ACM, 1991, 8393 SIGMOD Record, Jun. 20, 1991, No. 2, New York, US, XP 000364619, pp. 50-59.

Josephine Cheng, et al., "IBM DB2 XML Extender," IEEE, ICDE '00 Conference, San Diego, Feb. 2000, 128 pages.

Lo et al., "XAS: A System for Accessing Componentized, Virtual XML Documents," IEEE, 2001, pp. 493-502. (References located on CD-ROM).

Zisman et al., "Using XML to Build Consistency Rules for Distributed Specifications," Proceedings of the Tenth International Workshop on Software Specification and Design (IWSD'00), IEEE 2000, 8 pages. (References located on CD-ROM).

Myllymaki, Jussi, "Effective Wed data Extraction with Standard XML Technologies," WWW10, May 1-5, 2001, pp. 689-696. (References located on CD-ROM).

Schmidt et al., "Why and How to Benchmark XML Databases," SIGMOND Record, vol. 3, No. 3, Sep. 2001, pp. 27-32. (References located on CD-ROM).

* cited by examiner

| RowID | LogicalID | VersionID | LABEL |
|-------|-----------|-----------|--------|
| r1 | D | v1 | SUM |
| r2 | D | v2 | WIN |
| r3 | E | v1 | |
| r4 | E | v2 | SUM, WIN |
| r5 | F | | SUM, WIN |
| r6 | G | | SUM, WIN |
| r7 | H | | SUM, WIN |

Partitioned Index 250

251 (SUM)

| INDEX KEY | IRowID |
|-----------|--------|
| D | r1 |
| E | r4 |
| F | r5 |
| G | r6 |
| H | r7 |

252 (WIN)

| INDEX KEY | IRowID |
|-----------|--------|
| D | r2 |
| E | r4 |
| F | r5 |
| G | r6 |
| H | r7 |

Partitioned Index 260

261 (SUM)

| INDEX KEY | IRowID |
|-----------|--------|
| D | r1 |
| E | r4 |

262 (WIN)

| INDEX KEY | IRowID |
|-----------|--------|
| D | r2 |
| E | r4 |

263 (Non-Versioned)

| INDEX KEY | IRowID |
|-----------|--------|
| F | r5 |
| G | r6 |
| H | r7 |

FIG. 3

INDEXING TO EFFICIENTLY MANAGE VERSIONED DATA IN A DATABASE SYSTEM

RELATED APPLICATIONS

The present application claims priority from the following U.S. Provisional Patent Applications, the entire contents of which are incorporated herein by reference for all purposes:

U.S. Provisional Patent Application No. 60/326,052, filed on Sep. 28, 2001, entitled File Based Access Provided With a Database System, by Eric Sedlar and Viswanathan Krishnamurthy;

U.S. Provisional Patent Application No. 60/378,800, filed on May 7, 2002, entitled SQL Access to Data that Provides a File System Abstraction, by Nipun Agarwal, Ravi Murthy, Eric Sedlar, Sivasankaran Chandrasekar, Fei Ge, Syam Pannala, Neema Jalali and Muralidhar Krishnaprasad.

The present application is also related to the following U.S. patent applications, the entire contents of which are incorporated herein by reference for all purposes:

U.S. patent application Ser. No. 10/260,138, filed on equal day herewith, entitled OPERATORS FOR ACCESSING HIERARCHICAL DATA IN A RELATIONAL SYSTEM, by Nipun Agarwal, Ravi Murthy, Eric Sedlar, Sivasankaran Chandrasekar and Fei Ge;

U.S. patent application Ser. No. 10/260,384, filed on equal day herewith, entitled PROVIDING A CONSISTENT HIERARCHICAL ABSTRACTION OF RELATIONAL DATA, by Nipun Agarwal, Eric Sedlar, Ravi Murthy and Namit Jain;

U.S. patent application Ser. No. 10/259,278, filed on equal day herewith, entitled MECHANISM FOR MAPPING XML SCHEMAS TO OBJECT-RELATIONAL DATABASE SYSTEMS, by Ravi Murthy, Muralidhar Krishnaprasad, Sivasankaran Chandrasekar, Eric Sedlar, Viswanathan Krishnamurthy and Nipun Agarwal;

U.S. patent application Ser. No. 10/256,524, filed on Sep. 27, 2002, entitled MECHANISMS FOR STORING CONTENT AND PROPERTIES OF HIERARCHICALLY ORGANIZED RESOURCES, by Ravi Murthy, Eric Sedlar, Nipun Agarwal, and Neema Jalali;

U.S. patent application Ser. No. 10/259,176, filed on equal day herewith, entitled MECHANISM FOR UNIFORM ACCESS CONTROL IN A DATABASE SYSTEM, by RAVI MURTHY, ERIC SEDLAR, NIPUN AGARWAL, SAM IDICULA and NICOLAS MONTOYA;

U.S. patent application Ser. No. 10/256,777, filed on equal day herewith, entitled LOADABLE UNITS FOR LAZY MANIFESTATION OF XML DOCUMENTS by Syam Pannala, Eric Sedlar, Bhushan Khaladkar, Ravi Murthy, Sivasankaran Chandrasekar, and Nipun Agarwal;

U.S. patent application Ser. No. 10/260,381, filed on equal day herewith, entitled MECHANISM TO EFFICIENTLY INDEX STRUCTURED DATA THAT PROVIDES HIERARCHICAL ACCESS IN A RELATIONAL DATABASE SYSTEM, by Neema Jalali, Eric Sedlar, Nipun Agarwal, and Ravi Murthy.

FIELD OF THE INVENTION

The present invention relates to relational database systems and, more specifically, to techniques for indexing data stored in a database system.

BACKGROUND OF THE INVENTION

Tables that may contain multiple versions of a row are referred to herein as versioned tables. If there are v versions for r rows to store in the table, then the total number of rows in the table is v*r. For example, if there are 5 versions for 1000 rows, then the total number of rows is 5*1000, which is 5000.

Versioned tables, as with other types of tables, may be indexed so that the tables may be accessed more efficiently. An approach for indexing a versioned table is the entry-per-version approach. Under the entry-per-version approach, an index has one entry for each version of a row in the table. Thus, the size of an index is proportional to the number of row versions stored in a table.

A problem with indexes created under the entry-per-version approach is that the approach inflates the number of entries in an index for a table with a given number of rows because the index contains multiple entries for each row, one for each version, even if the versions are identical. Indexes with a greater number of entries inherently require more data processing when scanning or traversing the indexes, and are therefore less efficient to use than an index with a lesser number of entries.

Applications that access versioned table are generally interested in one version of rows. Therefore, there is need for an approach that allows applications to retrieve and process only those rows that belong to a particular version of interest. One such approach is the application-level approach. Under the application-level approach, applications themselves are programmed with logic needed to retrieve and process rows of a given version. Programming applications with such logic complicates the already complex task of developing applications.

Based on the foregoing, it is clearly desirable to provide a mechanism that reduces the amount of data that has to be processed when using indexes that index versioned tables and that reduces or eliminates the need to program applications that process data from a versioned table.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and apparatus for accessing information using indexes on versioned tables is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Described herein is a system that exploits the power of partitioned indexing to index versioned data. In partitioned indexing, an index is divided in sub-indexes, referred to as index partitions. An index may be, for example, partitioned according to a particular version identified by a version id, that is, each index partition indexes the rows in a versioned table that belong to the version identified by a particular version id. Partitioned indexes can be more efficient to use to access versioned data. The utility of partitioned indexes extends beyond indexing versioned data, as described in greater detail below.

Illustrative Versioned Table and Partitioned Indexes

Figure 1:
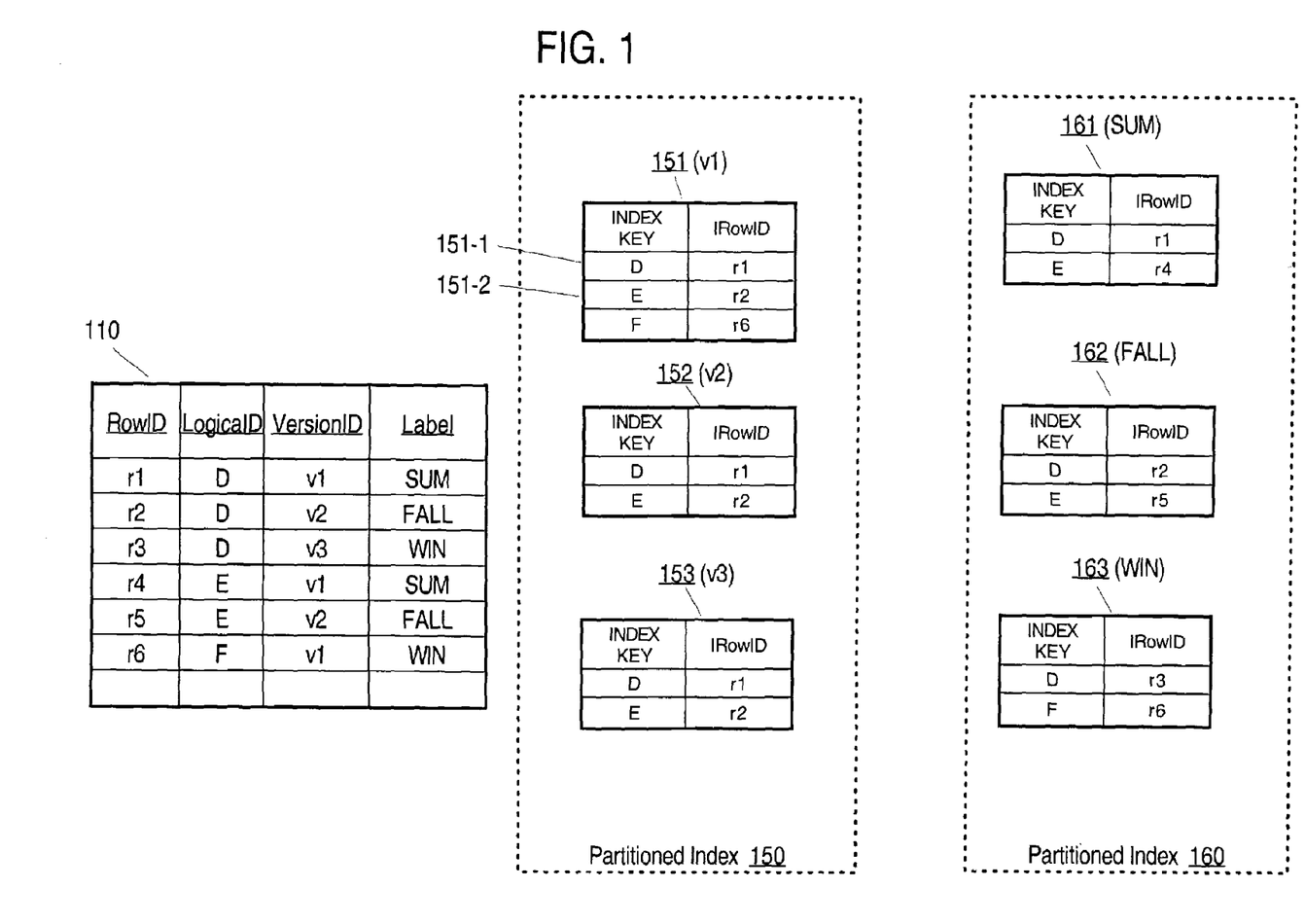
FIG. 1 is a block diagram of a versioned table and partitioned index according to an embodiment of the present invention.

FIG. 1 is a block diagram of a versioned table 110, according to an embodiment of the present invention. Table 110 contains a row-id psuedo-column RowID, which contains row-ids that identify a row in table 110. The row-ids are used herein to refer to a row in table 110. For example, row-id r1 refers to the first row in table 110.

Table 110 contains multiple versions of rows. For each version of a row, there is one physical row in table 110. Rows r1, r2, r3 are versions of a row; rows r4, r5 are versions of another row; and row r6 is a version of yet another row. A version column, such as VersionID, contains version-ids, which identify the version of a particular row. For example, for row r1, VersionID contains the version-id v1.

A column LogicalID contains a logical identifier that identifies a logical row, versions of which are represented by one or more rows in table 110. All rows in table 110 that represent the same logical row have the same logical identifier in column LogicalID. For example, row r1, r2, and r3 contain the logical identifier D. Rows r1, r2, and r3 are referred to as "versioned rows" because they each represent a version of logical row D.

A database system maintains and supports a versioned table in various ways. For example, a database server may commence to treat and maintain a table as a versioned table in response to receiving a DDL (Data Definition Language) statement specifying so. The version column for the table is implemented as a hidden column. Hidden columns are not exposed to end users; database statements issued from the user are not permitted to explicitly reference a hidden column. The database server populates a version column as needed when the database server creates a versioned row.

A database server may create a versioned row in various ways. For example, the database server may create a new version of a row when a database transaction modifies the row. Alternatively, the database server may create a new version of a row when the row is "checked out" by a user. Some database servers provide API functions for "checking out" and "checking in" rows. Before updating the row, the row is checked out through the API, and a new version of the row is created, referred to herein as the current version. Updates to the row while it is checked-out are applied to the new version until the row is "checked-in", at which point updates to the row are barred until the row is checked-out once again.

The term API is used herein to refer to one or more functions, procedures, or commands that may be referenced in a statement written in a computer language to cause a database server to perform a particular type of operation. Examples of an API include functions referenced in a statement written in procedural languages, such as PL/SQL or C/C++, or a function or command referenced in a database language, such as SQL.

Column LABEL is a label column. A label logically represents specific versions of all rows of a table i.e. {version $v_1$ of Row$_i$}. A label column is a column that can contain, for each row, one or more labels. However, all rows illustrated in table 110 have just one label. For example, for row r1, LABEL contains the label SUM, specifying that row r1 belongs to the set of rows labeled SUM. An embodiment in which a label column contains multiple labels shall be later described.

Labels are useful for representing items that can belong to multiple sets, groups, or categories, especially where one version of an item belongs to one label, and another version of an item belongs to another. For example, logical row D may represent a ski in a catalog. Versioned row r1 may represent the summer version, which has a lower price. Row r2 may represent a FALL version, having a higher price.

Partitioned Indexes

FIG. 1 also shows partitioned indexes 150 and 160, each of which is partitioned into index partitions. Each index partition corresponds to a value in one or more columns of a table, referred to as partition keys. The values in a partition key are referred to as partition key values. As illustrated below, all rows that have the partition key value are indexed by the index partition corresponding to that partition key value.

Partitioned index 150 includes index partitions 151, 152, and 153, each of which corresponds to a partition key value in VersionID. The index key for partition index 150 and its index partitions 151, 152, 153 is LogicalID. Index partition 151 corresponds to partition key value v1, and thus indexes rows in table 110 that have the value v1 in VersionID. Entry 151-1 indexes row r1 to index key value D, the value in LogicalID for row r1. Entry 151-2 indexes row r2 to index key value E, the value in LogicalID for row r2. Index partition 152 and 153 correspond to partition key values v2 and v3, respectively, and thus index rows in table 110 that have value v1 and v2 in VersionID, respectively.

Partitioned index 160 includes index partitions 161, 162, and 163, each of which corresponds to a partition key value in LABEL. The index key for partition index 160 and index partitions 161, 162, and 163 is LogicalID. Index partitions 161, 162 and 163 correspond to partition key values SUM, FALL, and WIN, respectively, and thus index rows in table 110 that have value SUM, FALL, and WIN in LABEL, respectively.

A database server creates a partitioned index, and each of its index partitions, in response to receiving one DDL statement. The statement specifies among other attributes of the index, the partition key.

Each index is stored by the database server in its own storage area. Database metadata on the database server specifies each of the storage areas.

An index partition may be a b-tree index, a bit-map index, a hash index, a text index, or even a relational table. The present invention is not limited to any particular way of organizing the entries within an index partition.

Nor is the present invention limited to any particular type of table or database server. For example, table 110 may be a non-partitioned or a partitioned table, containing multiple table partitions that may be partitioned by values in a different column then the partition key for the table's partitioned index, and may be a relational table in a relational database system or an object-relational table in a object-relational database system.

Indexes Used in a Manner Transparent to the User

As mentioned before, users that issue database statements to a database server for data in table 110 are typically only interested in a single version of rows or a single label of interest. In such cases, it may be advantageous to process queries using a partitioned index, and in particular, one index partition in the partitioned index. To use index partitions to process queries for users only interested in a single version or label when efficient to do so, ways are needed to declare or designate the version or label of interest, and to cause a database server to use an index partition to execute a database statement when advantageous to do so.

According to an embodiment of the present invention, these functions are performed automatically by the database server, in a manner that is transparent to the user, that is, database statements issued to query or modify table 110 need not specify the version or label of interest, or what particular index partition to use, allowing a human individual to write database statements that are less complicated.

The database server performs the function of designating a version or label of interest for a user by maintaining a value that specifies them in user environment attributes. User environment attributes are maintained and associated with a user by a database server while the database server performs work for or requested by the user. Environment attributes may be associated with a user session, and may established by a database server when the user session is established, based on information the database server maintains about database users. Environment attributes may be changed during the life of the user session through an API. When the database server needs to determine what the version or label of interest is for a user, the database server refers to the environment attribute that stores that information. There is no need to specify in the query what the version or label of interest is. A version or label defined by the environment attribute in this way is referred to herein as the current version or label, respectively.

The function of causing a database server to use an index partition to execute a database statement when advantageous to do so is performed by a query optimizer and execution planner. A query optimizer examines a database statement received by a database server, determines whether the database statement may be rewritten into a form that can be executed more efficiently, and if so, rewrites the query to generate a transformed database statement. In the case of a database statement that requires access to a versioned table or table with a label column, the query optimizer may rewrite the database statement, adding to the statement a predicate that filters rows based on the current version or label. For example, a database server may receive the following query A, in which table 110 is referred to as EMP:

select * from EMP

In response to receiving the query, the query optimizer determines that table EMP is a versioned table with a label column. The current label is SUM. The query optimizer adds predicates that filter rows based on column LABEL and the current label, to rewrite query A as query $A_L$ as follows.

select * from EMP where
LABEL='SUM'

Similarly, if the current version is "v2", query A may be rewritten as follows to query $A_V$.

select * from EMP where
VersionID='V2'

After the query optimizer processes a database statement, an execution planner generates an execution plan for executing the database statement. An execution plan defines operators, which are definitions of a set of operations that carry out a task, and an order in which to execute the operators. The operators include an operator for accessing a particular index. When generating an execution plan, the execution planner evaluates various factors that affect efficiency. Once an execution plan is generated, the database executes the plan's operators, including the operator for accessing the index.

When the execution planner evaluates the query $A_V$, it generates a plan that may include an index scan operator, defining operations for scanning partitioned index 150. The particular index partition used within a partitioned index depends on the partition key value specified in the predicate expression that filters based on the partition key. For example, in an execution plan for query A that includes an operator for scanning partitioned index 150, the particular index partition selected for scanning is index partition 152, the index partition associated with the partition key value v2, which is the value referred to in the predicate VersionID='v2' from query A.

The database server also transparently performs the operations needed to modify a partitioned index as needed to maintain consistency with the indexed table as it is changed. For example, when row r2 is inserted, the database server determines that the partition index within partitioned index 150 to modify is index partition 151, and then adds entry 151-2 to the index partition 151.

As shown above, many of the operations needed to maintain, use, and optimize the use of a partitioned index are performed transparently by the database server. A human individual that designs applications that use versioned tables and partitioned indexes does not have to deal with the complexity of programming software to perform these operations, thereby reducing the complexity of developing such applications.

Another advantage of partitioned indexes is that when executing queries that are interested in only one label or version of rows, as is typical, the amount work entailed to scan the partitioned indexes to execute the queries is similar to that for non-partitioned indexes. Because only one version or label is needed, only one index partition need be scanned to compute such queries. Performance or operations involving use of partitioned indexes is therefore not proportional or dependent on the number of versions, labels, or in general, the number of partition key values.

Row-Level Versioning

In an embodiment of the present invention, some but not all rows in the table are versions of a row. Versioning can be specified at the row-level, that is, the user can specify, through an API, whether a row added to a versioned table is or is not a version of another row. This type of versioning, where some rows in a table are versioned and some are not versioned, is referred to as row-level versioning. This feature is useful for applications for which not all data needs to be stored as versioned data. For example, some items in a catalog may have different versions, one for the winter, spring, summer, and fall, while other items may be the same in every season. To represent an item that is the same for all seasons, it is more efficient to store one non-versioned row that represents the item for any season, rather than storing multiple versions of a row, one for each season, where each version is a veritable copy of the other versioned rows for the item.

Figure 2:
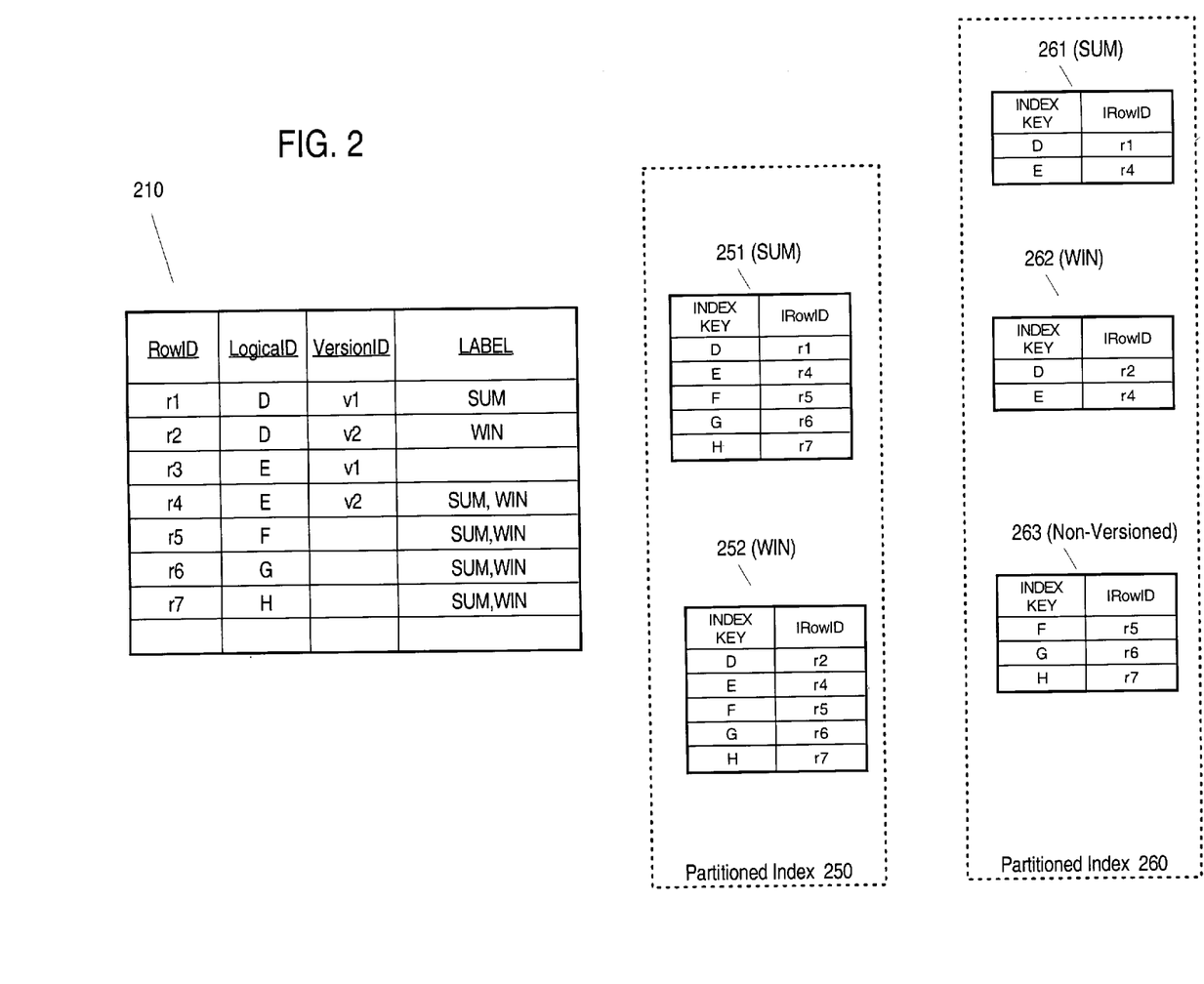
FIG. 2 is a block diagram of a versioned table and partitioned index according to an embodiment of the present invention.

FIG. 2 shows a versioned table 210 with row-level versioning and a partitioned index that supports row-level versioning according to an embodiment of the present invention. Referring to FIG. 2, table 210 contains both versioned rows and non-versioned rows. Rows r1 and r2 are versions of the logical row D; rows r3 and r4 are versions of the logical row E. Rows r5, r6, and r7 are non-versioned rows identified by the logical-id F, G, and H, respectively.

Rows r1, r2, r3, and r4 contain a version id in column VersionID identifying their respective version. Rows r5, r6, and r7 do not have a version id in column VersionID because they are non-versioned rows.

As mentioned before, a label column may contain multiple labels, and therefore may be used to specify the multiple labels to which a row version or a non-versioned row may belong. Some rows in table 210 demonstrate such a use of a label column. LABEL may contain labels SUM and WIN, representing the seasons summer and winter. Non-versioned rows r5, r6, and r7 contain the labels SUM and WIN in LableID. Versioned row r4 also contains the labels SUM and WIN in LableID.

Partition index 250 demonstrates a partition index scheme that supports row-level versioning. Partition index 250 contains index partitions 251 and 252. Each partition index indexes a row that belongs to a particular label. Rows that belong to more than one label are indexed in more than one partition. For example, rows r4, r5, r6, and r7 each have a corresponding entry in both index partitions 251 and 252. Note that for non-versioned rows, there are index entries in multiple index partitions.

Partition index 260 demonstrates another partition index scheme that supports row-level versioning. Partitioned index 260 contains index partitions that index only versioned rows that belong to a particular label, and an index partition that indexes all non-versioned rows. Specifically, index partition 261, which indexes versioned rows belonging to label SUM, indexes rows r1 and r4; index partition 262, which indexes versioned rows belonging to label WIN, indexes rows r2 and r4. Index partition 263 indexes non-versioned rows r5, r6, and r7.

The partitioned index scheme demonstrated by partitioned index 260 provides space savings in addition to the space savings that may be realized through row-level versioning. While row-level versioning saves storage space by allowing data that does not to be versioned to be stored in a non-versioned row rather than multiple versioned rows, the scheme of partitioned index 260 saves space by creating and storing only one index entry for the non-versioned rows rather than multiple index entries, as in the case of the partition scheme demonstrated by partitioned index 250.

Hardware Overview

Figure 3:
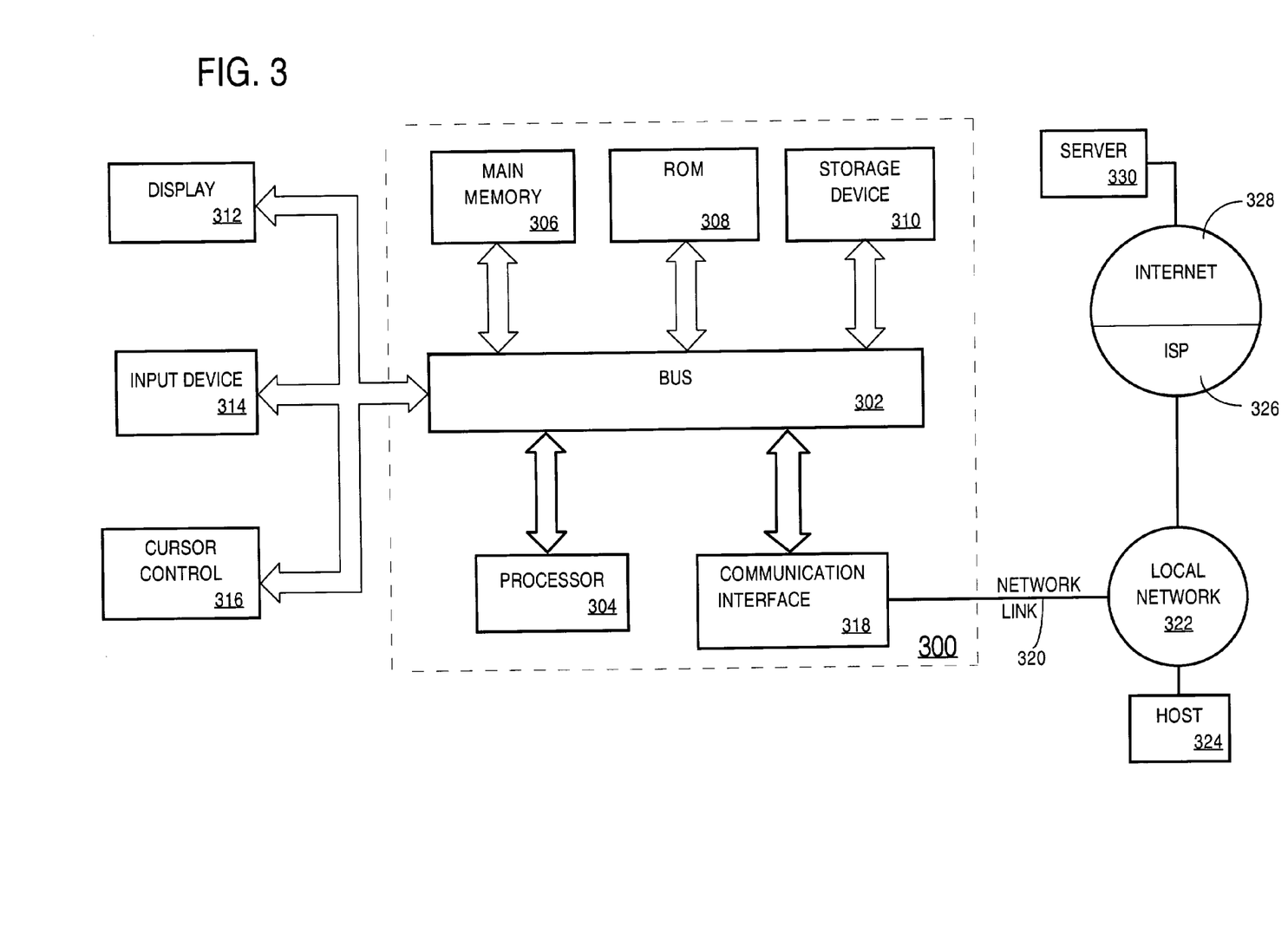
FIG. 3 is a block diagram of a computer system according to an embodiment of the present invention.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hardwired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of indexing a table, the method comprising the steps of:
   storing, in a first index partition of a partitioned index, entries that index a first set of rows, wherein the first set of rows belongs to said table and contains a first value in a partition key of said table, wherein said partitioned index includes said first index partition and a second index partition,
      wherein said table is not partitioned on the partition key; and
   storing, in said second index partition, entries that index a second set of rows, wherein the second set of rows belongs to said table and contains a second value in the partition key.

2. The method of claim 1, wherein:
   said partitioned index includes a plurality of partitions that include said first index partition;
   the steps further include:
      receiving a database statement;
      detecting that the database statement requires rows from said table that have said first value in said partition key; and
      in response to detecting that the database statement requires rows from said table that have said first value in said partition key, of said plurality of partitions, accessing only said first index partition to execute said database statement.

3. The method of claim 2, wherein:
   a database server stores an attribute value associated with a user; and
   said database server causes the step of accessing only said first index partition based on said attribute value.

4. The method of claim 3, wherein said database server causes the step of accessing only said first index partition by performing one or more steps that include adding a predicate to said database statement to create a transformed database statement, wherein said predicate is based on said partition key and said attribute value.

5. The method of claim 1, wherein:
   storing in a first index partition of a partitioned index includes storing in said first index partition an entry that indexes a row that has said first value and said second value in said partition key; and
   storing in said second index partition includes storing in said second index partition another entry that indexes said row.

6. The method of claim 1, wherein said table is a partitioned table that includes a plurality of table partitions.

7. The method of claim 1, wherein said partition key contains values that identify row versions.

8. The method of claim 1, wherein:
   said first set of rows and said second set of rows hold versioned data; and
   the steps further include storing in a third set of rows data that is not versioned.

9. The method of claim 8, further including storing, in a third index partition of said partitioned index, entries that only index said third set of rows.

10. The method of claim 1, wherein:
    said table is a non-partitioned table.

11. The method of claim 1, wherein:
    said table is a partitioned table.

12. The method of claim 11, wherein:
    said partitioned table is partitioned by values in a different column than the partition key.

13. A computer-readable medium carrying one or more sequences of instructions for indexing a table, wherein execution of the one or more sequences of instructions by one or more processors causes the one or more processors to perform the steps of:
    storing, in a first index partition of a partitioned index, entries that index a first set of rows, wherein the first set of rows belongs to said table and contains a first value in a partition key of said table, wherein said partitioned index includes said first index partition and a second index partition,
       wherein said table is not partitioned on the partition key; and
    storing, in said second index partition, entries that index a second set of rows, wherein the second set of rows belongs to said table and contains a second value in the partition key.

14. The computer-readable medium of claim 13, wherein:
    said partitioned index includes a plurality of partitions that include said first index partition;
    the steps further include:
       receiving a database statement;
       detecting that the database statement requires rows from said table that have said first value in said partition key; and
       in response to detecting that the database statement requires rows from said table that have said first value in said partition key, of said plurality of partitions, accessing only said first index partition to execute said database statement.

15. The computer-readable medium of claim 14, wherein:
a database server stores an attribute value associated with a user; and
said database server causes the step of accessing only said first index partition based on said attribute value.

16. The computer-readable medium of claim 15, wherein said database server causes the step of accessing only said first index partition by performing one or more steps that include adding a predicate to said database statement to create a transformed database statement, wherein said predicate is based on said partition key and said attribute value.

17. The computer-readable medium of claim 13, wherein:
storing in a first index partition of a partitioned index includes storing in said first index partition an entry that indexes a row that has said first value and said second value in said partition key; and
storing in said second index partition includes storing in said second index partition another entry that indexes said row.

18. The computer-readable medium of claim 13, wherein said table is a partitioned table that includes a plurality of table partitions.

19. The computer-readable medium of claim 13, wherein said partition key contains values that identify row versions.

20. The computer-readable medium of claim 13, wherein:
said first set of rows and said second set of rows hold versioned data; and
the steps further include storing in a third set of rows data that is not versioned.

21. The computer-readable medium of claim 20, further including storing, in a third index partition of said partitioned index, entries that only index said third set of rows.

22. The computer-readable medium of claim 13, wherein:
said table is a non-partitioned table.

23. The computer-readable medium of claim 13, wherein:
said table is a partitioned table.

24. The computer-readable medium of claim 23, wherein:
said partitioned table is partitioned by values in a different column than the partition key.

25. A database system configured for indexing a table, said database system comprising:
means for storing, in a first index partition of a partitioned index, entries that index a first set of rows, wherein the first set of rows belongs to said table and contains a first value in a partition key of said table, wherein said partitioned index includes said first index partition and a second index partition,
wherein said table is not partitioned on the partition key; and
means for storing, in said second index partition, entries that index a second set of rows, wherein the second set of rows belongs to said table and contains a second value in the partition key.

26. The database system of claim 25, wherein:
said partitioned index includes a plurality of partitions that include said first index partition;
said database system further comprising:
means for receiving a database statement;
means for detecting that the database statement requires rows from said table that have said first value in said partition key; and
means for, in response to detecting that the database statement requires rows from said table that have said first value in said partition key, of said plurality of partitions, accessing only said first index partition to execute said database statement.

* * * * *